Patented Oct. 29, 1935

2,019,354

UNITED STATES PATENT OFFICE 2,019,354

UREA-CONDENSATION RESINOUS COMPOSITIONS

Barnard M. Marks, Arlington, N. J., assignor to Dupont Viscoloid Company, Wilmington, Del., a corporation of Delaware No Drawing. Application January 23, 1932, Serial No. 588,489

4 Claims. (Cl. 260—3)

This invention relates to urea-condensation resinous compositions and production thereof, and more particularly it relates to synthetic resins, and to articles molded therefrom which are substantially water insensitive. Furthermore, it relates to resinous compositions produced by the reaction of urea and a composition of matter which I hereafter for convenience term an "intermediate". This composition of matter is formed by the reaction of hydrogen sulphide and an aldehyde, e. g. formaldehyde, in aqueous solution with a pH between 2 and 12, and preferably between 4 and 7.5, and at a temperature between substantially 20° C. and substantially 100° C. when the reaction is carried out under atmospheric pressure, and preferably between 40° C. and 50° C. When the reaction for the production of the composition of matter is carried out under pressures above atmospheric, the temperature limits may be varied in accordance with the pressure used.

One object of the invention is to provide resinous compositions of the above mentioned, and other desirable characteristics. A further object is to provide molding and casting methods for the use of such compositions. A further object is to provide castings and molded articles embodying said compositions. A further object is to provide methods for the manufacture, and the use, of compositions of the character indicated. To these ends and also to improve generally on compositions, methods, etc., of the character indicated, the invention consists in the various matters hereinafter described and claimed.

In preferable general accordance with the invention, the present resinous compositions are produced by the condensation of an intermediate with urea, the particular intermediate used being formed by passing hydrogen sulphide into an aqueous solution of formaldehyde under the conditions above mentioned. The reaction for the production of the intermediate may be carried forward to the extent of complete saturation of the formaldehyde solution with hydrogen sulphide, to produce a solid product; or the reaction may be carried to less than the complete saturation point, to produce the intermediate in solution. A lower content of sulphur is obtained by only partially saturating the formaldehyde solution, and the intermediate is present in a clear or slightly turbid solution. The intermediate may be used in either the solid form or the liquid form, for reaction with urea in accordance with the present invention.

The urea, in carrying out the reaction between it and the intermediate, whether the intermediate be the saturated solid or the partially saturated solution, is preferably used in an aqueous solution, the preferable proportion of intermediate to urea being about 1½ gram mols of intermediate to 1 gram mol. of urea, although other proportions may be used. If 1 gram mol. of urea is employed the allowable range of intermediate will be between 2½ gram mols and 1 gram mol. The temperature of the reaction mixture is preferably held between 30° C. and 70° C., and it is particularly desirable to work between 40° C. and 50° C. Below 30° C. the reaction is slowed up to an extent which makes the reaction impractical on a commercial operating scale. When operating above 70° C. the control of the reaction and the control of the properties of the final resin are less readily accomplished.

The reaction can be carried out successfully in a neutral medium but it is accelerated by being carried out in an acid or alkaline medium. When a catalyst is used, it may serve not only as a means for adjusting the pH but also serve as an accelerator per se. When using a catalyst a very satisfactory method is to use a basic catalyst in the initial stage of the reaction, followed by acidification with a weak acid.

The reaction between the intermediate and the urea does not result in the separation of sulphur; and the sulphur content of the intermediate is therefore present in the final resin. The initial reaction between the intermediate and the urea gives a flowable reaction product which on further heating finally becomes hydrophobic and gelatinizes into a hard insoluble, infusible, vitreous mass. If the reaction is stopped while the reaction mass is still flowable, the mass can be used to impregnate a filler, and, after drying, the mixture can be molded in a mold into an insoluble, infusible mass by the suitable application of heat and pressure. While, as brought out in certain of the examples hereinafter presented, the molding may be desirably carried out in accordance with certain detailed procedures, the resin-containing mixtures readily adapt themselves to, and are moldable in accordance with, the standard practices for molding and hardening ("setting-up") resin.

If desired the condensation may be carried out with a mixture of the intermediate and formaldehyde, as by adding part of the urea to formaldehyde, and then, after separately making the intermediate and adding it to the formaldehyde-urea solution, adding the remaining portion of the urea. The additional amount of urea necessary for the formaldehyde should be in the proportion of 1 gram mol. of urea to 1 to 2½ gram mols of formaldehyde. This manner of proceeding does not require any changes in the major steps of the general procedure except as indicated.

As has been above indicated, the reaction for the production of the resin may be carried to different stages, depending upon the detailed character of the particular product desired and the use to which it is to be put. When the product is to be used for the production of unfilled, cast or molded articles the reaction is carried somewhat further than is the case when the resin is to be used for impregnating a filler. In producing the unfilled resin for casting purposes, when the desired degree of polymerization has been reached, the reaction mass being fluid, the reaction mass is subjected to vacuum distillation at a temperature not over 50° C. (A jelling inhibitor, e. g. sodium phosphate, may be used if desired.) The concentrate is then poured into molds (with or without a prior treatment with a jelling accelerator, e. g. sodium chloride). The articles cast in this way are finally subjected to a curing treatment not exceeding 100° C. until a final infusible state has been reached. While the same process of eliminating the water can be used for unfilled molded articles it is easier to dry the resin in any suitable way at a temperature below 50° C., pulverize the resin, and use the powder for molding.

The intermediate, or composition of matter resulting from the reaction of formaldehyde and hydrogen sulphide may be made in various detailed ways, the variation in detail not affecting the composition insofar as its use for reaction with urea for the manufacture of resins, in accordance with the present invention, is concerned. The primary conditions are, as above mentioned, that the hydrogen sulphide be added to an aqueous solution of e. g. formaldehyde with a pH between 2 and 12, and preferably between 4 and 7.5, with a temperature between 20° C. and 100° C. under atmospheric pressure, and preferably between 40° C. and 50° C. As exemplified in my Patent 1,991,765 hereafter referred to and filed on even date, on the production of the intermediate, even though the preferable pH and temperatures are not strictly adhered to in the production of the intermediate, it may be desirable to work in a somewhat narrower range than pH 2 to 12 and at a temperature below 100° C., e. g. pH between 3 and 8.5 and temperature not exceeding about 60° C. The reaction may be carried to incomplete saturation of the solution with hydrogen sulphide, or carried to complete saturation, depending upon whether it is desired to use the product of the reaction (which forms the "intermediate" of the present process of resin manufacture) in a liquid or in a solid state. Merely by way of illustration, the following will serve as an example of the production of the composition:—

Into 30 g. (1 gram mol.) of formaldehyde (provided by 80.5 g. of a freshly made formaldehyde solution, 37% by weight of formaldehyde), the solution having a pH of 6 to 7, hydrogen sulphide gas was passed at such a rate that it was fully absorbed (i. e. without escape of excess hydrogen sulphide). The absorption was accompanied by a noticeable heat of reaction so that a rise in temperature took place from room temperature (20° C.) to about 40° C. in the reaction vessel. The reaction was carried on under atmospheric pressure and continued until there was no further absorption of hydrogen sulphide and the reaction mass had become saturated with hydrogen sulphide giving the crude product, a white pulverulent amorphous solid. For substantially complete saturation about 22 g. (0.65 g. mol.) of hydrogen sulphide was required. Three crystallizations of this crude product from chloroform gave a white almost odorless, crystalline compound, having a melting point of 80° C. (uncorrected) and containing 51.5% sulphur. The product is soluble in various organic solvents, e. g. chloroform, ethylene dichloride, propylene dichloride and toluene. It is only slightly soluble in water and may be crystallized from hot water. It is a stable product and exhibits characteristics of a complex structural compound. It condenses very readily with various substances, e. g. urea to form useful resins. The densities and refractive indices of the herein mentioned partially saturated solutions indicate the probable formation of stable complexes in situ.

Without restricting the invention thereto, the following are examples of the present invention. In the examples, where the example includes a description of the addition of hydrogen sulphide to formaldehyde, for the production of the intermediate, it will be understood that the above recited conditions of a pH range between 2 and 12, and a temperature range between 20° C. and 100° C. when working under atmospheric pressure are preferably to be conformed to. Also, in reference to the initial production of the reaction product of hydrogen sulphide and formaldehyde, while the crude product may be purified by crystallization as previously mentioned, before proceeding with the dispersion thereof and the production of the present resinous composition, such purification is commercially generally unnecessary and the crude product may be used. It will be understood that in the examples designation of the reaction product of hydrogen sulphide and formaldehyde as "the intermediate" has reference to its being an intermediate in the full process of resin manufacture, rather than it being an intermediate in the reaction between hydrogen sulphide and formaldehyde.

*I*

Into two gram mols of formaldehyde in the form of commercial formalin solution, hydrogen sulphide was added to saturation. The resulting solid intermediate which separated was dispersed in 200 cc. of water. One gram mol. of urea was dissolved in the least possible amount of water and in this form was added to the dispersion of the intermediate and the mixture heated at approximately 50° C. until the resin separated. The reaction mixture was subjected to vacuum distillation continued until the reaction mass had consistency of a thick paste. The resin was placed in a drier and allowed to stand for 24 hours at a temperature about but not above 70° C. The resulting resin in the form of hard lumps was ground to a fine powder. A suitable quantity of the ground powder was then placed in a chrome plated molding die, and the die heated by steam at a pressure of 50 to 60 pounds. A stainless steel die gave equally satisfactory results. At the same time the die was closed under a hydraulic pressure of approximately 2000 pounds per square inch. The setting up time was approximately three minutes, after which the hydraulic pressure was released and the finished article ejected from the die.

II

To 2 gram mols of formaldehyde in the form of commercial formalin solution hydrogen sulphide was added to saturation. The resulting intermediate which separated was dispersed in 200 cc. of water and 0.5 g. of boric acid added. 1 g. mol. of urea was dissolved in the least amount of water and added to the dispersion of the intermediate which had previously been warmed at 40° C. with agitation in a standard resinification apparatus. The temperature of the reaction mixture was maintained for 40 minutes at this temperature. The reaction mixture was subjected to vacuum distillation at a temperature below 60° C. and the distillation continued until the reaction mass had a consistency of a thick paste. The resin was placed in a drier and allowed to stand for 24 hours at a temperature about but not above 70° C. The resulting resin in the form of hard lumps was ground to a fine powder. A suitable quantity of the ground powder was then placed in a chrome plated molding die, and the die heated by steam at a pressure of 50 to 60 pounds. A stainless steel die gave equally satisfactory results. At the same time the die was closed under a hydraulic pressure of approximately 2000 pounds per square inch. The setting-up time was approximately three minutes, after which the hydraulic pressure was released and the finished article ejected from the die.

III

To 1½ gram mols of freshly made aqueous formaldehyde, hydrogen sulphide was added to saturation. The resulting intermediate which separated was dispersed in 150 cc. of water and dilute sodium hydroxide added to produce a pH between 8 and 9. 1 gram mol. of urea was dissolved in the least possible amount of water and this solution was added to the dispersion of the intermediate and the mixture heated at about 50° C. for 20 minutes. 2½ g. of boric acid was then added in water solution and the reaction continued for one hour at approximately 50° C. The contents were then subjected to a vacuum distillation at a temperature between 50° and 60° C. and the distillation was continued until the reaction mass had the consistency of a thick paste. The paste was then treated as described in Example II.

IV

To 2 gram mols of aqueous formaldehyde (161 g. of freshly made formaldehyde solution containing 37% by weight of formaldehyde), hydrogen sulphide was added to saturation. The resulting intermediate which separated was dispersed in 200 cc. of water and heated to a temperature of 50° C. 1 gram mol. of urea was dissolved in the least possible amount of water and in this form was added to the dispersion of the intermediate and the mixture heated at approximately 50° C. for 30 minutes. 2.5 g. of boric acid was then added in water solution and the reaction continued for one hour at approximately 50° C. The reaction mixture was poured into 100 g. of ground alpha cellulose contained in a suitable mixer. On completion of the impregnation the mass was placed in a drier and allowed to stand for 24 hours at a temperature of about but not above 70° C.

The resulting dried molding mixture was ground to a fine powder, for example in a ball mill, with 12.5 g. titanium dioxide pigment. A suitable quantity of the ground powder was then placed in a molding die, preferably of stainless steel or chrome plated, and the die heated by steam at a pressure of 50 to 60 pounds. At the same time the die was closed under a hydraulic pressure of approximately 2000 pounds per square inch. The setting-up time was approximately three minutes, after which the hydraulic pressure was released and the finished article ejected from the die.

V

To 2 gram mols of formaldehyde in the form of commercial formalin solution, hydrogen sulphide was added to saturation. The resulting solid intermediate which separated was dispersed in 200 cc. of water and 0.1 g. of oxalic acid added. 1 gram mol. of urea was dissolved in the least amount of water and added to the dispersion of the intermediate which had previously been warmed to 40° C. with agitation. The temperature of the reaction mixture was maintained for 40 minutes at this temperature. The reaction mixture was then poured, etc. as described in Example IV.

VI

To 2 gram mols of formaldehyde in the form of commercial formalin solution, hydrogen sulphide was added to saturation. The resulting solid intermediate which separated was dispersed in 200 cc. of water and dilute sodium hydroxide added to produce a pH between 8 and 9. 1 gram mol. of urea was dissolved in the least possible amount of water and in this form was added to the dispersion of the intermediate and the mixture heated at approximately 50° C. for twenty minutes in a standard resinification apparatus. 2½ g. of boric acid was then added in water solution and the reaction continued for one hour at approximately 50° C. The reaction mixture was poured into 100 g. of wood flour which was contained in an ordinary mixer, e. g. a Werner and Pfleiderer dough mixer. When the impregnation was completed the mass was placed in a drier and allowed to stand for twenty-four hours at a temperature of about but not above 70° C. The resulting dried molding mixture was ground to a fine powder, for example in a ball mill with 5 g. carbon black. A suitable quantity of the ground powder was then placed in a molding die, preferably of stainless steel or chromium plated, and the die heated by applying steam at a pressure of 50 to 60 pounds. At the same time the die was closed under a hydraulic pressure of approximately 2000 pounds per square inch. The setting up time was approximately three minutes, after which the hydraulic pressure was released and the finished article ejected from the die.

VII

To 1.5 gram mols of formaldehyde in the form of commercial formalin solution, hydrogen sulphide was added to saturation. The resulting solid intermediate which separated was dispersed in 200 cc. of water and dilute sodium hydroxide added to produce a pH between 8 and 9. 1 gram mol. of urea was dissolved in the least possible amount of water and in this form was added to the dispersion of intermediate and the mixture heated at approximately 50° C. for 20 minutes in a standard resinification apparatus. 2½ g. of boric acid was then added in a water solution and the reaction continued for one hour at approximately 50° C. The reaction mixture was then poured, etc., as described in Example VI.

VIII

To 4 gram mols of formaldehyde in the form of commercial formalin solution, hydrogen sulphide was added to saturation. The resulting solid intermediate which separated was dispersed in 500 cc. of water and 2½ cc. of concentrated ammonium hydroxide added. Two mols of urea was dissolved in the least possible amount of water and in this form were added to the dispersion of the intermediate and the mixture heated at approximately 40° C. for 1½ hours in a standard resinification apparatus. The reaction mixture was poured into 200 g. of alpha cellulose which was contained in a suitable mixer. When the impregnation was completed the mass was placed in a drier and allowed to stand for 24 hours at a temperature of about but not above 70° C. One-half of the resulting dried molding mixture was ground to a fine powder with 40 g. of Cadmium red. The other half of the dried molding mixture was ground to a fine powder with 20 g. of titanium dioxide pigment. The two powders were combined and a suitable quantity was then placed in a molding die as described in previous examples and pressed in the mold, as in Example IV, to give a mottled effect.

IX

Into 162 g. of commercial formalin (37% by weight of formaldehyde) contained in a suitable vessel, hydrogen sulphide was passed at a rate wherein all of the gas was completely absorbed. During the progress of the reaction the temperature in the reaction vessel rose to 40° C. When the sulphur content of the solution was 12.26% corresponding to 27.4% in the reaction product, the addition of the hydrogen sulphide was discontinued, the solution being unsaturated with hydrogen sulphide and the reaction product being in solution. To this solution was added one gram mol of urea in aqueous solution. The reaction mixture was warmed at about 50° C. for 15 minutes, at the end of which time 2.5 g. of boric acid dissolved in water was added. The reaction was continued for about one hour at 50° C. The reaction mass was poured into a filler, dried, ground and molded as described in Example IV.

X

To 4 gram mols of formaldehyde in the form of commercial formalin solution hydrogen sulphide was added to saturation. The resulting solid intermediate which separated was dispersed in 500 cc. of water and 2½ g. of hexamethylene tetramine was added. The dispersion was warmed to 40° C. 2 gram mols of urea was dissolved in the least possible amount of water and in this form was added to the dispersion of intermediate and the mixture heated at approximately 50° C. for 20 minutes in a standard resinification apparatus. 5 g. of boric acid was then added in water solution and the reaction continued for one hour at approximately 50° C. The reaction mass was then poured, etc., as described in Example IV.

The following examples illustrate the possibility, hereinbefore mentioned of proceeding by adding formaldehyde to the intermediate when condensing with urea, the urea being added both to the formaldehyde and to the mixture of formaldehyde and the intermediate. In the examples, as in the previous cases the reaction between the hydrogen sulphide and the formaldehyde is carried on in an aqueous solution having a pH between 2 and 12 and a temperature between 20° C. and 100° C. when working under atmospheric pressure.

XI

To 4 gram mols of formaldehyde in aqueous solution 10 cc. of 0.536 N. sodium hydroxide and a saturated aqueous solution of 2 gram mols urea were added. The mixture was heated for 20 minutes at a temperature of 40° C. 5 g. of boric acid was then added in water solution and the reaction continued for 20 minutes at 40° C. 2 gram mols of formaldehyde in the form of commercial formalin solution was saturated with hydrogen sulphide. The resulting intermediate which separated was dispersed in 500 cc. of water and added to the above reaction mixture. The reaction mixture was agitated for 15 minutes. 1 gram mol. of urea was dissolved in the least possible amount of water and in this form was added to the last reaction mixture which was then heated for an additional 40 minutes. The solution was concentrated at a temperature not above 50° C. by vacuum distillation. (In order to retard gelation 10 g. of trisodium phosphate may be added in an aqueous solution.) By continuing the distillation the concentrate finally became quite viscous and was poured into molds. After the resin had set the articles were removed from the molds and cured at a temperature of approximately 100° C. for from 24 to 72 hours depending on the thickness of the article.

XII 4 gram mols of formaldehyde was made alkaline with sodium hydroxide using methyl orange as an indicator. To this solution warmed at 40° C., 2 gram mols of urea dissolved in the least possible amount of water was added and the solution heated for 40 minutes at 40° C. 10 g. of boric acid was then added in water solution and the heating continued for 90 minutes. The reaction mixture was agitated. 2 gram mols of formaldehyde in the form of commercial formalin solution was saturated with hydrogen sulphide and the resulting intermediate which separated was dispersed in 500 cc. of water and the dispersion added to the agitated reaction mass. One gram mol. of urea dissolved in the least possible amount of water was added to the last reaction mass and the heat continued for one hour. The reaction mass was then poured, etc., as in Example IV.

For the sake of definiteness of description and also because formaldehyde is preferable for various reasons the production of the intermediate has been described with more particular reference to formaldehyde. However, it is understood that the intermediate can be made with polymers of formaldehyde e. g. paraformaldehyde and aldehydes other than formaldehyde, as acetaldehyde and furfuraldehyde, and the same methods for reacting urea and the intermediate can be applied when using an intermediate made with the use of aldehydes other than formaldehyde, as are applied when using intermediates made with the use of formaldehyde. That is, a resin can be made by the action of hydrogen sulphide and acetaldehyde followed by condensation of the product of the reaction with urea. Also furfuraldehyde and other aldehydes may be used. Similarly in processes such as exemplified by Examples XI and XII, similar substitutions may be made. In place of urea certain of the substituted ureas may be used, in whole or in part, for example methyl phenyl urea and the like. Also other carbamide derivatives may be used such as guanidine and substituted guanidines. Thiourea may be used in place of urea.

Since the intermediates are entirely new to the arts, the question of naming them arises. From a full consideration of nomenclature, the proper name is evidently "formthional". That is since, the intermediates are derived from formaldehyde, contain a very substantial amount of sulphur and exhibit the properties of aldehydic compounds and since thioformaldehyde is meththional it follows that "formthional" is the correctly derived name for the intermediates.

By means of the processes disclosed in this invention molded products can be formed which are highly useful in the arts. They may be used, for example, in the manufacture of various toilet articles, cups, pin trays, bottle caps, buttons, library fittings, etc. The resin lends itself to the production of molded articles having great beauty and many colors can be produced which imitate natural substances such as onyx, jade, and the like. The resin can also be used in electrical work since it has very effective insulating properties. The molded products have a very high degree of water resistance, either hot or cold, and are resistant also to the action of sunlight and possess very considerable mechanical strength so that the articles are not easily broken. Besides these uses many other uses will be apparent to those skilled in the manufacture of molded articles.

While I do not limit my invention to any particular theory as to the reaction that occurs between urea and the intermediate in accordance with the present invention, I may say that the following appears to be a reasonably probable explanation:—

When the intermediate and urea are condensed and polymerized at no time during the resinification is any hydrogen sulphide evolved. Even during the curing of the resin, namely, the molding operation, no hydrogen sulphide is given off. Thus when urea and the intermediate are condensed the sulphur is held in some stable combination with the rest of the molecule.

On the other hand when thiourea and formaldehyde are caused to condense, polymerize and resinify, during the curing or molding operation, hydrogen sulphide is definitely evolved. This phenomena is explained on the interpretation that the sulphur of the thiourea resin molecule is in a less stable combination and when the final curing takes place the sulphur is split out from the resin as hydrogen sulphide.

This reaction can be illustrated as follows: It is an accepted fact that aldehydes and ketones have a tendency to add a molecule of water and form, in aqueous solutions, hydrates. A definite example of this hydration is the case of chloral which forms with one molecule of water chloral hydrate.

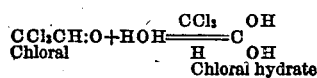

In the same way a molecule of urea in aqueous solution will add on a molecule of water forming a hydrated urea.

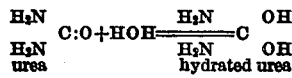

Thus thiourea in aqueous solution will form hydrated thiourea.

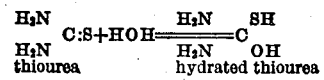

Since the hydrated aldehydes and ketones and other carbonyl derivatives readily lose a molecule of water, especially on desiccation, they revert back to the unsaturated carbonyl state. In the case of hydrated thiourea where there are two alcohol groups attached to the carbon one of them is a hydroxyl group (OH) and the other a thiohydroxyl group (SH). On desiccation the dehydration does not necessarily split out a molecule of water but can also split out hydrogen sulphide. This is a possible explanation of the evolution of hydrogen sulphide during the curing of thiourea-formaldehyde resins.

In the case of intermediate-urea resins one finds that there is no sulphur attached to the original urea molecule but that the sulphur is attached to the intermediate. It will readily be seen that in the two reactions, the condensation of thiourea and formaldehyde is different from the reaction that takes place between urea and intermediate. In the latter, polymerization is not accompanied by the evolution or splitting out of any hydrogen sulphide.

It will be understood that, in mentioning ranges of temperature and of pH as "between" certain limiting figures, the limiting figures are included in the stated range. The "intermediate" herein mentioned, and the production thereof, are described and claimed in my U. S. Patent 1,991,765, Aldehyde-hydrogen sulphide reaction product, Feb. 19, 1935, and the various compositions of that case are usable in the practice of the present invention. The compositions are mercaptans, the reaction being evidently, of the type (using formaldehyde for illustration)

$$4CH_2O + aq. + 3H_2S = (CH_2S)_3 \cdot CH_2O \cdot H_2O$$

a chain compound including one or more SH groups.

I claim:—

1. The method of producing a resinous composition which method comprises, reacting urea, and formaldehyde in substantially the proportion (gram mols) urea 1: formaldehyde 1 to 2.5, the composition of matter formed by reacting hydrogen sulphide and an aldehyde in an aqueous solution, having a pH between substantially 4 and substantially 7.5, and continuing the reaction without interruption until a product containing combined sulphur is produced, and additional urea in substantially the proportion (gram mols) urea 1: such composition 1 to 2.5.

2. The method of producing a resinous composition which method comprises, reacting urea, and formaldehyde in substantially the proportion (gram mols) urea 1: formaldehyde 1 to 2.5, the composition of matter comprising essentially a solid reaction product of formaldehyde and hydrogen sulphide, having a sulphur content of substantially 51.5% and a melting point of substantially 80° C., and additional urea in substantially the proportion (gram mols) urea 1: such composition 1 to 2.5.

3. The resinous composition substantially identical with that obtainable by the method recited in claim 1.

4. The resinous composition substantially identical with that obtainable by the method recited in claim 2.

BARNARD M. MARKS.